2,833,795
Patented May 6, 1958

2,833,795

PROCESSES OF PRODUCING $\Delta^{4,8(14)}$-3,11,20-TRIKETO - 17 - HYDROXY-21-ACYLOXY-PREGNADIENES Robert P. Graber, Elizabeth, Norman L. Wendler, Summit, and Calvin Stewart Snoddy, Jr., Plainfield, N. J., assignors to Merck & Co., Inc., Rahway, N. J., a corporation of New Jersey No Drawing. Application October 13, 1955
Serial No. 540,335

9 Claims. (Cl. 260—397.45)

This invention is concerned generally with novel processes for preparing steroid compounds. More particularly, it relates to a new method for preparing $\Delta^{4,8(14)}$-3,20-diketo-11-oxygenated-17-hydroxy-21-acyloxy - pregnadiene compounds. These new compounds possess pharmacological activity similar to that shown by cortisone and are thus of value in the treatment of arthritis and related diseases.

In accordance with the present invention, $\Delta^4$-3,20-diketo-9,11-oxido-17-hydroxy-21-acyloxy-pregnene (compound 1 hereinbelow) is reacted with perchloric acid to produce $\Delta^{4,8(14)}$-3,20-diketo-11,17-dihydroxy-21 - acyloxypregnadiene (compound 2), which is reacted with an oxidizing agent to form $\Delta^{4,8(14)}$-3,11,20-triketo - 17 - hydroxy-21-acyloxy-pregnadiene (compound 3). These reactions may be chemically represented as follows:

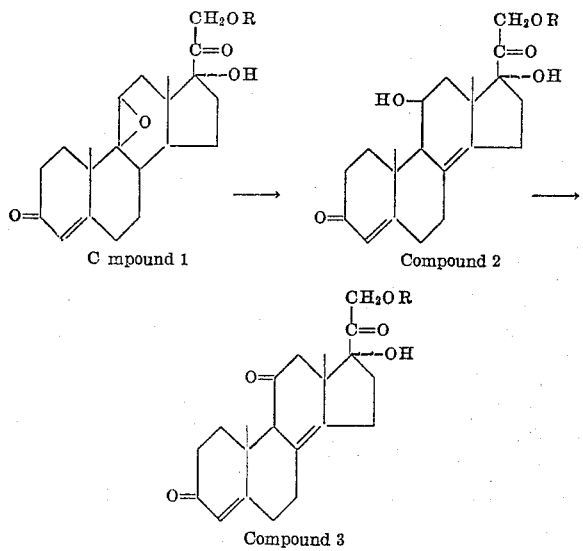

Compound 1     Compound 2

Compound 3

The starting materials employed in our new process are old compounds which are conveniently prepared by reacting the corresponding $\Delta^4$-3,20-diketo-9-bromo-11,17-dihydroxy-21-acyloxy-pregnene with a base thereby forming the corresponding $\Delta^4$-3,20-diketo-9,11-oxido-17-hydroxy-21-acyloxy-pregnene as for example $\Delta^4$-3,20-diketo-9,11-oxido-17-hydroxy-21-(lower alkanoyloxy)-pregnene, $\Delta^4$-3,20-diketo-9$\beta$,11$\beta$-oxido-17$\alpha$ - hydroxy - 21 - acetoxypregnene, $\Delta^4$-3,20-diketo-9$\beta$,11$\beta$-oxido-17$\alpha$ - hydroxy - 21 - propionoxy-pregnene, $\Delta^4$-3,20-diketo-9$\beta$,11$\beta$ - oxido - 17$\alpha$-hydroxy-21-benzoxy-pregnene, and the like.

The reaction between the $\Delta^4$-3,20-diketo-9,11-oxido-17-hydroxy-21-acyloxy-pregnene and the perchloric acid is conveniently conducted by bringing the reactants together in the cold in an inert organic solvent as for example a halogenated hydrocarbon solvent. The reaction is preferably carried out in chloroform at a temperature of about 0° C., under which conditions the reaction is ordinarily complete in about fifteen minutes. At the end of the reaction period ice water is added to the reaction mixture, and the chloroform layer is separated and washed with water until substantially free of acid. The chloroform solution is dried, evaporated to dryness in vacuo, and the residual material is recrystallized from an organic solvent such as acetone to give $\Delta^{4,8(14)}$-3,20-diketo-11,17-dihydroxy-21-acyloxy-pregnadiene as for example $\Delta^{4,8(14)}$-3,20-diketo-11,17 - dihydroxy - 21 - (lower alkanoyloxy) pregnadiene, $\Delta^{4,8(14)}$ - 3,20-diketo-11$\beta$,17$\alpha$-dihydroxy-21-acetoxy-pregnadiene, $\Delta^{4,8(14)}$ - 3,20 - diketo-11$\beta$,17$\alpha$-dihydroxy-21-propionoxy-pregnadiene, $\Delta^{4,8(14)}$ - 3,20 - diketo-11$\beta$,17$\alpha$-dihydroxy-21-benzoxy-pregnadiene, and the like.

The oxidation of the $\Delta^{4,8(14)}$-3,20-diketo-11,17-dihydroxy-21-acyloxy-pregnadiene is ordinarily conducted utilizing chromium trioxide in aqueous pyridine as the oxidizing agent and conducting the oxidation reaction at about room temperature. Under these conditions the reaction is usually complete in about fifteen hours. The reaction mixture is diluted with water, filtered and extracted with a water-immiscible organic solvent such as ethyl acetate, and the resulting extract is washed with dilute aqueous acid, with water and then with saturated aqueous salt solution. The organic solvent extract is dried, evaporated to dryness in vacuo, and the residual material is recrystallized from an organic solvent such as acetone-petroleum ether to give $\Delta^{4,8(14)}$-3,11,20-triketo-17-hydroxy-21-acyloxy-pregnadiene as for example $\Delta^{4,8(14)}$-3,11,20 - triketo - 17$\alpha$ - hydroxy-21-(lower alkanoyloxy)-pregnadiene, $\Delta^{4,8(14)}$-3,11,20-triketo-17$\alpha$-hydroxy-21-acetoxy-pregnadiene, $\Delta^{4,8(14)}$ - 3,11,20-triketo-17$\alpha$-hydroxy-21-propionoxy-pregnadiene, $\Delta^{4,8(14)}$ - 3,11,20-triketo-17$\alpha$-hydroxy-21-benzoxy-pregnadiene, and the like.

The following examples illustrate methods of carrying out the present invention, but it is to be understood that these examples are given for purposes of illustration and not of limitation.

Example 1

201 mg. of 9$\beta$,11$\beta$-oxido-4-pregnene-3,20-dione-17$\alpha$,21-diol 21-acetate is dissolved in 5 ml. chloroform, and the solution is cooled to 0° C.; 5 ml. of 60% perchloric acid is added to the resulting solution, and the reaction mixture is stirred at 0° C. for 15 minutes. Approximately 25 ml. of ice water is added, and the mixture is agitated. The layers are separated, and the chloroform solution containing the steroid is washed with water until free of acid. The chloroform solution is dried and is then evaporated to dryness in vacuo. The solid residual material is recrystallized from acetone to give crystalline 4,8(14)-pregnadiene-11$\beta$,17$\alpha$,21-triol-3,20-dione 21-acetate; M. P. 258–260° C.

Example 2

402.5 mg. of 4,8(14)-pregnadiene-11$\beta$,17$\alpha$,21-triol-3,20-dione 21-acetate is dissolved in 4 ml. pyridine. To this is added a solution of 333 mg. of chromium trioxide dissolved in 0.33 ml. H$_2$O and 1.0 ml. pyridine. The resulting mixture is allowed to stand overnight at room temperature, and the reaction mixture after dilution with water is filtered through a filter aid in order to clarify the solution. The filtrate containing the desired product is extracted with ethyl acetate, and the extract is washed with dilute aqueous hydrochloric acid solution, with water, and then with saturated aqueous sodium chloride solution. The extract is then dried and evaporated to dryness in vacuo. The residual material is recrystallized from acetone/petroleum ether to give crystalline 4,8(14)-pregnadiene-17$\alpha$,21-diol-3,11,20-trione 21 acetate; M. P. 226–230° C.

Various changes and modifications may be made in carrying out the present invention without departing from

We claim:

1. The process which comprises reacting $\Delta^4$-3,20-diketo-9,11-oxido-17-hydroxy-21-lower hydrocarbon carbonyloxy-pregnene with perchloric acid to produce $\Delta^{4,8(14)}$-3,20-diketo-11,17-dihydroxy-21-lower hydrocarbon carbonyloxy-pregnadiene, and reacting the latter compound with an oxidizing agent to form $\Delta^{4,8(14)}$-3,11,20-triketo-17-hydroxy-21-lower hydrocarbon carbonyloxy-pregnadiene.

2. The process which comprises reacting $\Delta^4$-3,20-diketo-9,11-oxido-17-hydroxy-21-(lower alkanoyloxy)-pregnene with perchloric acid to produce $\Delta^{4,8(14)}$-3,20-diketo-11,17-dihydroxy-21-(lower alkanoyloxy)-pregnadiene, and reacting the latter compound with an oxidizing agent to form $\Delta^{4,8(14)}$-3,11,20-triketo-17-hydroxy-21-(lower alkanoyloxy)-pregnadiene.

3. The process which comprises reacting $\Delta^4$-3,20-diketo-9$\beta$,11$\beta$-oxido-17$\alpha$-hydroxy-21-acetoxy-pregnene with perchloric acid to produce $\Delta^{4,8(14)}$-3,20-diketo-11$\beta$,17$\alpha$-dihydroxy-21-acetoxy-pregnadiene, and reacting the latter compound with chromium trioxide in pyridine to form $\Delta^{4,8(14)}$-3,11,20-triketo-17$\alpha$-hydroxy-21-acetoxy-pregnadiene.

4. The process which comprises reacting $\Delta^4$-3,20-diketo-9,11-oxido-17-hydroxy-21-lower hydrocarbon carbonyloxy-pregnene with perchloric acid to produce $\Delta^{4,8(14)}$-3,20-diketo-11,17-dihydroxy-21-lower hydrocarbon carbonyloxy-pregnadiene.

5. The process which comprises reacting $\Delta^4$-3,20-diketo-9,11-oxido-17-hydroxy-21-(lower alkanoyloxy)-pregnene with perchloric acid to produce $\Delta^{4,8(14)}$-3,20-diketo-11,17-dihydroxy-21-(lower alkanoyloxy)-pregnadiene.

6. The process which comprises reacting $\Delta^4$-3,20-diketo-9$\beta$,11$\beta$-oxido-17$\alpha$-hydroxy-21-acetoxy-pregnene with perchloric acid to produce $\Delta^{4,8(14)}$-3,20-diketo-11$\beta$,17$\alpha$-dihydroxy-21-acetoxy-pregnadiene.

7. The process which comprises reacting $\Delta^{4,8(14)}$-3,20-diketo-11,17-dihydroxy-21-lower hydrocarbon carbonyloxy-pregnadiene with an oxidizing agent to form $\Delta^{4,8(14)}$-3,11,20-triketo-17-hydroxy-21-lower hydrocarbon carbonyloxy-pregnadiene.

8. The process which comprises reacting $\Delta^{4,8(14)}$-3,20-diketo-11,17-dihydroxy-21-(lower alkanoyloxy)-pregnadiene with an oxidizing agent to form $\Delta^{4,8(14)}$-3,11,20-triketo-17-hydroxy-21-(lower alkanoyloxy)-pregnadiene.

9. The process which comprises reacting $\Delta^{4,8(14)}$-3,20-diketo-11$\beta$,17$\alpha$-dihydroxy-21-acetoxy-pregnadiene with chromium trioxide in pyridine to form $\Delta^{4,8(14)}$-3,11,20-triketo-17$\alpha$-hydroxy-21-acetoxy-pregnadiene.

References Cited in the file of this patent

UNITED STATES PATENTS

| | | |
|---|---|---|
| 2,323,277 | Miescher | June 27, 1943 |
| 2,503,842 | Reichstein | Apr. 11, 1950 |
| 2,730,525 | Hogg | Jan. 10, 1956 |
| 2,734,897 | Chemerda | Feb. 14, 1956 |